US010818230B1

(12) United States Patent
Lu

(10) Patent No.: US 10,818,230 B1
(45) Date of Patent: Oct. 27, 2020

(54) TFT PIXEL THRESHOLD VOLTAGE COMPENSATION CIRCUIT WITH SHORT DATA PROGRAMMING TIME

(71) Applicant: Sharp Kabushiki Kaisha, Osaka (JP)

(72) Inventor: Tong Lu, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/429,395

(22) Filed: Jun. 3, 2019

(51) Int. Cl.
*G06F 3/038* (2013.01)
*G09G 5/00* (2006.01)
*G09G 5/10* (2006.01)
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/043* (2013.01); *G09G 2300/0426* (2013.01); *G09G 2300/0809* (2013.01)

(58) Field of Classification Search
CPC ... G09G 3/3233; G09G 3/3266; G09G 3/3258
See application file for complete search history.

(56) References Cited

U.S. PATENT DOCUMENTS 7,414,599 B2 8/2008 Chung et al.
8,054,259 B2 11/2011 Kim
9,123,294 B2 9/2015 Han et al.
1,006,232 A1 8/2018 Na et al.
2014/0184665 A1* 7/2014 Yoon .................... G09G 3/3241 345/691
2014/0218415 A1* 8/2014 Pak ...................... G09G 3/3291 345/690
2014/0253612 A1* 9/2014 Hwang ................ G09G 3/3258 345/691
2017/0270853 A1* 9/2017 Xiang .................. G09G 3/3275
2018/0090071 A1* 3/2018 Ma ....................... G09G 3/3258

* cited by examiner

*Primary Examiner* — Nan-Ying Yang
(74) *Attorney, Agent, or Firm* — Renner, Otto, Boisselle & Sklar, LLP

(57) ABSTRACT

A pixel circuit for a display device is operable in a compensation phase, a data programming phase, and an emission phase, whereby the one horizontal time is minimized while maintaining accurate compensation of the threshold voltage of the drive transistor, and noise applied to the gate of drive transistor during the emission phase is substantially eliminated. The pixel circuit includes a drive transistor configured to control an amount of current from a power supply to a light-emitting device during the emission phase depending upon a voltage input applied to a gate of the drive transistor, and a threshold voltage of the drive transistor is compensated during the compensation phase. The pixel circuit further includes two transistors, one of which is connected between a data voltage input line and the other transistor, and the other transistor further is connected to the gate of the drive transistor, such that when the two transistors are in an on state during the data programming phase, the data voltage is applied to the gate of the drive transistor. The pixel circuit further may include another transistor that is connected between the power supply and a node N1 between the two transistors, such that during the emission phase, the power supply is applied to the node N1 to shield the drive transistor from noise from the data voltage input line.

19 Claims, 6 Drawing Sheets

TFT PIXEL THRESHOLD VOLTAGE COMPENSATION CIRCUIT WITH SHORT DATA PROGRAMMING TIME

TECHNICAL FIELD

The present invention relates to design and operation of electronic circuits for delivering electrical current to an element in a display device, such as for example to an organic light-emitting diode (OLED) in the pixel of an active matrix OLED (AMOLED) display device.

BACKGROUND ART

Organic light-emitting diodes (OLED) generate light by re-combination of electrons and holes, and emit light when a bias is applied between the anode and cathode such that an electrical current passes between them. The brightness of the light is related to the amount of the current. If there is no current, there will be no light emission, so OLED technology is a type of technology capable of absolute blacks and achieving almost "infinite" contrast ratio between pixels when used in display applications.

Several approaches are taught in the prior art for pixel thin film transistor (TFT) circuits to deliver current to an element of a display device, such as for example an organic light-emitting diode (OLED), through a drive transistor. In one example, an input signal, such as a low "SCAN" signal, is employed to switch transistors in the circuit to permit a data voltage, VDAT, to be stored at a storage capacitor during a programming phase. When the SCAN signal is high and the switch transistors isolate the circuit from the data voltage, the VDAT voltage is retained by the capacitor and this voltage is applied to a gate of a drive transistor. With the drive transistor having a threshold voltage $V_{TH}$, the amount of current to the OLED is related to the voltage on the gate of the drive transistor by:

$$I_{OLED} = \frac{\beta}{2}(V_{DAT} - V_{DD} - V_{TH})^2$$

TFT device characteristics, especially the TFT threshold voltage $V_{TH}$, may vary with time or among comparable devices, for example due to manufacturing processes or stress and aging of the TFT device over the course of operation. With the same VDAT voltage, therefore, the amount of current delivered by the drive TFT could vary by a significant amount due to such threshold voltage variations. Therefore, pixels in a display may not exhibit uniform brightness for a given VDAT value.

Conventionally, therefore, OLED pixel circuits have high tolerance ranges to variations in threshold voltage and/or carrier mobility of the drive transistor by employing circuits that compensate for mismatch in the properties of the drive transistors. For example, an approach is described in U.S. Pat. No. 7,414,599 (Chung et al., issued Aug. 19, 2008), which describes a circuit in which the drive TFT is configured to be a diode-connected device during a programming period, and a data voltage is applied to the source of the drive transistor.

The threshold compensation time is decided by the drive transistor's characteristics, which may require long compensation time for high compensation accuracy. For the data programming time, the RC constant time required for charging the programming capacitor is determinative of the programming time. As is denoted in the art, the one horizontal (1H) time is the time that it takes for the data to be programmed for one row.

With such circuit configuration as in U.S. Pat. No. 7,414,599, the data is programmed at the same time as when the threshold voltage of the drive transistor is compensated. It is desirable, however, to have as short of a one horizontal time as possible to enhance the responsiveness and operation of the display device. This is because each row must be programmed independently, whereas other operations, such as for example drive transistor compensation, may be performed for multiple rows simultaneously. The responsiveness of the display device, therefore, tends to be dictated most by the one horizontal time for programming. When the data is programmed during the same operational phase as the drive transistor is compensated, the one horizontal time cannot be reduced further due to compensation accuracy requirements for the drive transistor, as the compensation requirements limit any time reductions for the programming phase.

One approach is described in U.S. Pat. No. 8,054,259 (Yang-won Kim, issued Nov. 8, 2011). In such circuit, during threshold compensation, the threshold voltage is stored on a first capacitor between the gate and source of the drive transistor and a second capacitor between the source of the drive transistor and a voltage supply. Then a data voltage is applied to the gate of the drive transistor and distributed between the two capacitors. In this way, the threshold voltage and a fraction of the data voltage is stored on the first capacitor. A disadvantage of this operation is that an initial voltage for the threshold compensation is supplied by the data line. A short programming time thus cannot be achieved.

A similar approach is described in U.S. Pat. No. 9,123,294 (Inhyo Han, issued Sep. 1, 2015). In such circuit, a dedicated reference voltage is applied during threshold compensation, and the threshold voltage is stored on a first capacitor between the gate and source of the drive transistor and a second capacitor between the source of the drive transistor and a voltage supply. Then a data voltage is applied to the gate of the drive transistor and distributed between the two capacitors. In this way, the threshold voltage and a fraction of the data voltage is stored on the first capacitor. As the threshold compensation and data programming are performed in two separated phases, a short programming time can be achieved. One disadvantage of this operation, however, is there could be leakage current through the drive transistor during the phase of initializing the capacitors. Another disadvantage of this operation is that the noise from the data line could couple to the storage capacitor, so the gate voltage of the drive transistor could be affected by this noise during the emission phase. Hence, the OLED current could be disturbed by the noise from the data line being applied to the gate of the drive transistor.

Another similar approach is described in U.S. Ser. No. 10/062,321 (Ji-Su Na, issued Aug. 28, 2018). During an initialization phase, a current path through the drive transistor is turned off and there would be no large instant current flow through the drive transistor during initialization. In such circuit, similar threshold compensation and data programming methods are used. This operation, however, still has the disadvantage of the data line coupling to the storage capacitor, so the gate voltage of the drive transistor could be affected by this noise during the emission phase. Hence, the OLED current could be disturbed by the noise from the data line applied to the gate of the drive transistor.

SUMMARY OF INVENTION

The present invention relates to pixel circuits that are capable of compensating the threshold voltage variations of the drive transistor with an ultra-short one horizontal time 1H of less than about 2 μs, which is shorter as compared to conventional configurations, with additionally shielding the possible data line noise that otherwise is coupled to the gate of the drive transistor in conventional configurations.

Embodiments of the present application provide pixel circuits for high refresh rate requirements, such as for 120 Hz applications. For such applications, an ultra-short 1H time (<2 μs) is achieved via separation of threshold compensation of the drive transistor and data programming phases. The threshold compensation time is dictated by the drive transistor characteristics and is difficult to reduce further without degrading the compensation accuracy. By separating the threshold compensation and data programming phases, a longer time can be allocated to threshold compensation for compensation accuracy. In addition, as referenced above, the RC constant time required for charging the programming capacitor is determinative of the programming time, and such programming time can be reduced to ultra-short 1H (<2 μs).

To achieve such results, a two-capacitor structure is used for the threshold compensation and the data programming. Two capacitors, $C_0$ and $C_1$, are used for threshold compensation. In particular, the first capacitor $C_0$ is used to store the data voltage, and the second capacitor $C_1$ is used for threshold compensation. After the drive transistor threshold has been compensated, data programming is performed as a separate phase independent of the compensation phase. The threshold compensation and data programming operations are thus performed independent of each other, which results in an ultra-short one horizontal time due to the short data programming phase. The data voltage applied at the gate of the drive transistor is scaled by the capacitor ratio $$\frac{C_0}{C_0 + C_1}.$$

Considering the parasitic capacitance as negligible, the voltage applied at the gate of the drive transistor after threshold compensation and data programming will be the sum of the compensated threshold voltage plus the scaled data voltage and reference voltage offset.

Embodiments of the present application also use an ultra-low leakage oxide transistor, such as an indium gallium zinc oxide (IGZO) transistor, as the data switch device such as transistor T4_2. By using such a device, the stored data voltage is retained longer due to ultra-low leakage of the IGZO transistor. The typical refresh rate is 60 Hz, but with the IGZO transistor the refresh rate can be reduced to 30 Hz or lower for static images. With a lower refresh rate, power consumption can be reduced.

In addition, during the compensation and programming phases, the EMI signal is applied to the programming capacitor $C_1$. The voltage boost from $\Delta V_{EMI}$ through the programming capacitor $C_1$ will make the initial voltage difference between the gate and the source of the drive transistor larger. A larger initial voltage difference will provide a higher initial current to charge the storage capacitor $C_0$, which aids in shortening the threshold compensation time or provides for more accurate threshold compensation. In conventional configurations, the EMI signal is only applied to the emission switch transistor but not to a capacitor that is associated with applying the source voltage to the drive transistor.

An aspect of the invention, therefore, is a pixel circuit for a display device operable in a compensation phase, a data programming phase, and an emission phase, whereby the one horizontal time is minimized while maintaining accurate compensation of the threshold voltage of the drive transistor, and noise applied to the gate of drive transistor during the emission phase is substantially eliminated. In exemplary embodiments, the pixel circuit includes a drive transistor configured to control an amount of current from a first power supply to a light-emitting device during the emission phase depending upon a voltage input applied to a gate of the drive transistor, and a threshold voltage of the drive transistor is compensated during the compensation phase; wherein the light-emitting device is electrically connected at a first node to a first terminal of the drive transistor during the emission phase and at a second node to a second power supply; a second transistor that is connected between the first power supply and a second terminal of the drive transistor that conducts current from the first power supply to the drive transistor during the emission phase; a first capacitor having a first plate that is connected to the second terminal of the drive transistor and a second plate that is connected to the gate of the drive transistor, and a second capacitor having a first plate that connected to an emission signal input line and a second plate that is connected to the second terminal of the drive transistor and first plate of the first capacitor, wherein the emission signal is applied to the second capacitor during the compensation and data programming phases; and a third transistor and a fourth transistor, wherein the third transistor is connected between a data voltage input line and the fourth transistor, and the fourth transistor is connected between the third transistor and the gate of the drive transistor, such that when the third and the fourth transistors are in an on state during the data programming phase, the data voltage is applied to the gate of the drive transistor. The pixel circuit further may include a fifth transistor that is connected between the first power supply and a node N1 between the third and fourth transistors, such that during the emission phase, the first power supply is applied to the node N1 to shield the drive transistor from noise from the data voltage input line.

Another aspect of the invention is a method of operating a pixel circuit according to any of the embodiments, whereby the one horizontal time is minimized while maintaining accurate compensation of the threshold voltage of the drive transistor, and noise applied to the gate of drive transistor during the emission phase is substantially eliminated. In exemplary embodiments, the method of operating includes the steps of providing a pixel circuit according to any of the embodiments; performing a compensation phase to compensate a threshold voltage of the drive transistor comprising: electrically disconnecting the second terminal of the drive transistor from the first power supply; boosting the voltage of the second terminal of the drive transistor by applying an emission signal from the emission signal input line to the first plate of the second capacitor; applying a reference voltage from a reference voltage input line to the gate of the drive transistor; and storing the threshold voltage of the drive transistor at the terminals of the first and the second capacitors and the second terminal of the drive transistor; performing a data programming phase to program a data voltage to the capacitors comprising applying the data voltage from the data voltage input line at the first plate of the first capacitor through the third and fourth transistors while the third and fourth transistors are in an on state; and performing an emission phase during which light is emitted from the light-emitting device comprising applying the first power supply through the drive transistor to the light emitting device while the second transistor is in an on state. Performing the emission phase further may include applying the first power supply to the node N1 to shield the drive transistor from noise from the data voltage input line while the fifth transistor is in an on state.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Figure 1:
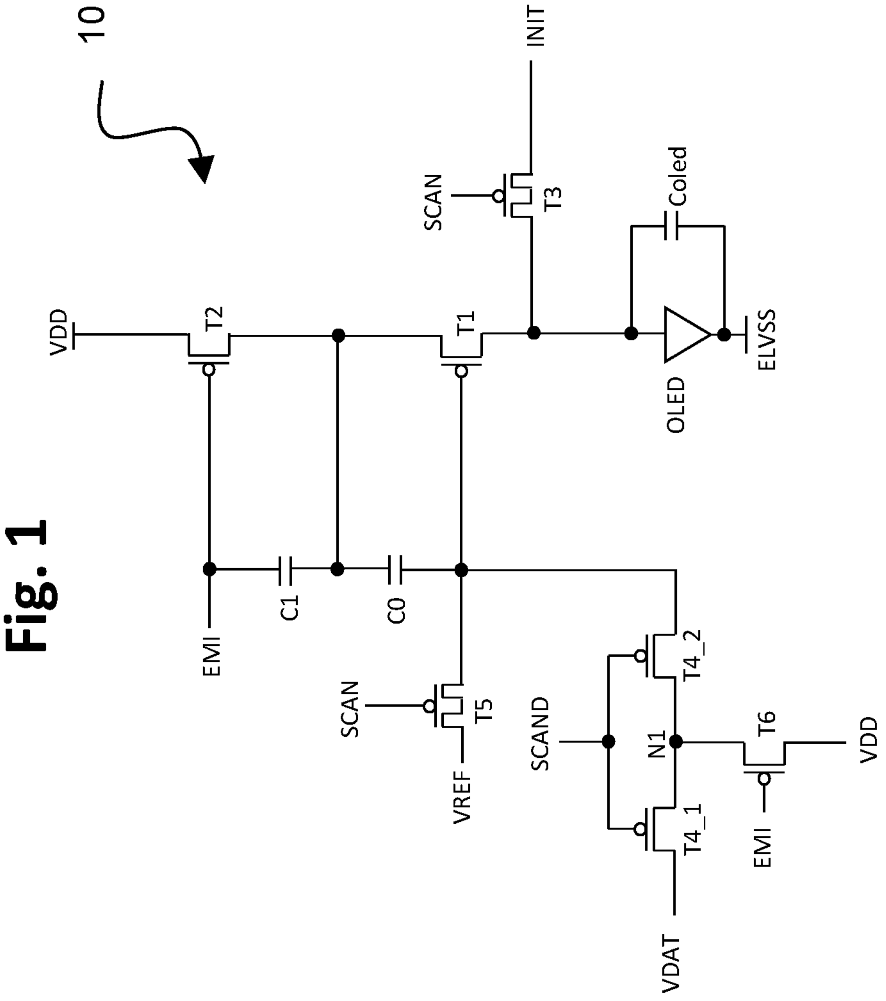
FIG. 1 is a drawing depicting a first circuit configuration in accordance with embodiments of the present invention.

Embodiments of the present invention will now be described with reference to the drawings, wherein like reference numerals are used to refer to like elements throughout. It will be understood that the figures are not necessarily to scale.

Figure 2:
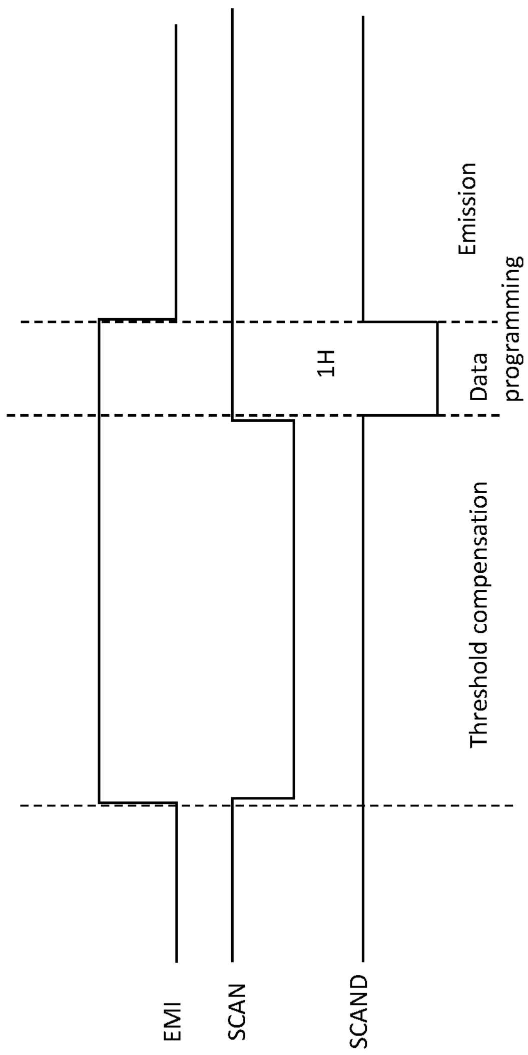
FIG. 2 is a drawing depicting a timing diagram associated with the operation of the circuit of FIG. 1.

FIG. 1 is a drawing depicting a first circuit configuration 10 in accordance with embodiments of the present invention, and FIG. 2 is a timing diagram associated with the operation of the circuit configuration 10 of FIG. 1. In this example, the circuit 10 is configured as a TFT circuit that includes multiple p-type transistors T1-T3, T4_1, T4_2, T5, T6 and two capacitors, $C_0$ and $C_1$. In this exemplary embodiment, T3 and T5 are double-gate TFTs as a preferred embodiment, which have low leakage between the source and drain, although T3 and T5 each alternatively may be a single gate TFT. The circuit elements drive a light-emitting device, such as for example an OLED. The light-emitting device (OLED) has an associated internal capacitance, which is represented in the circuit diagram as $C_{oled}$. In addition, although the embodiments are described principally in connection with an OLED as the light-emitting device, comparable principles may be used with display technologies that employ other types of light-emitting devices, including for example micro LEDs and quantum dot LEDs.

More specifically, FIG. 1 depicts the TFT circuit 10 configured with multiple p-MOS or p-type TFTs. T1 is a drive transistor that is an analogue TFT, and T2-T6 are digital switch TFTs. As referenced above, $C_0$ and $C_1$ are capacitors, and $C_{oled}$ is the internal capacitance of the OLED device (i.e., $C_{oled}$ is not a separate component, but is inherent to the OLED). The OLED further is connected to a power supply ELVSS as is conventional.

The OLED and the TFT circuit 10, including the transistors, capacitors and connecting wires, may be fabricated using TFT fabrication processes conventional in the art. It will be appreciated that comparable fabrication processes may be employed to fabricate the TFT circuits according to any of the embodiments.

For example, the TFT circuit 10 (and subsequent embodiments) may be disposed on a substrate such as a glass, plastic, or metal substrate. Each TFT may comprise a gate electrode, a gate insulating layer, a semiconducting layer, a first electrode, and a second electrode. The semiconducting layer is disposed on the substrate. The gate insulating layer is disposed on the semiconducting layer, and the gate electrode may be disposed on the insulating layer. The first electrode and second electrode may be disposed on the insulating layer and connected to the semiconducting layer using vias. The first electrode and second electrode respectively may commonly be referred to as the "source electrode" and "drain electrode" of the TFT. The capacitors may comprise a first electrode, an insulating layer and a second electrode, whereby the insulating layer forms an insulating barrier between the first and second electrodes. Wiring between components in the circuit, and wiring used to introduce signals to the circuit (e.g. SCAN, SCAND, EMI, VDAT, INIT) may comprise metal lines or a doped semiconductor material. For example, metal lines may be disposed between the substrate and the gate electrode of a TFT, and connected to electrodes using vias. The semiconductor layer may be deposited by chemical vapour deposition, and metal layers may be deposited by a thermal evaporation technique.

The OLED device may be disposed over the TFT circuit. The OLED device may comprise a first electrode (e.g. anode of the OLED), which is connected to transistors T1 and T3 in this example, one or more layers for injecting or transporting charge (e.g. holes) to an emission layer, an emission layer, one or more layers for injecting or transporting electrical charge (e.g. electrons) to the emission layer, and a second electrode (e.g. cathode of the OLED), which is connected to the power supply ELVSS in this example. The injection layers, transport layers and emission layer may be organic materials, the first and second electrodes may be metals, and all of these layers may be deposited by a thermal evaporation technique.

Referring to the TFT circuit 10 in combination with the timing diagram of FIG. 2, the TFT circuit 10 operates to perform in three phases: a threshold compensation phase, a data programming phase, and an emission phase for light emission. The time period for performing the programming phase is referred to in the art as the "one horizontal time" or "1H" as illustrated in timing diagram and subsequent the timing diagrams. A short 1H time is a requirement for displays with a large number of pixels in a column, as is necessary for high-resolution displays. As referenced above, a short one horizontal time is significant because each row must be programmed independently, whereas other operations, such as for example drive transistor threshold compensation, may be performed for multiple rows simultaneously. The responsiveness of the device, therefore, tends to be dictated most by the one horizontal time for programming.

Referring to the TFT circuit 10 in combination with the timing diagram of FIG. 2, during the previous emission phase, the EMI signal level has a low voltage value, so transistors T2 and T6 are on. With T2 is on, the light emission is being driven by the input driving voltage VDD connected to the drive transistor T1, whereby the actual current applied to the OLED is determined by the voltage at the gate of the drive transistor. With T6 is on, VDD also is applied at the node N1, which is located between the off transistor T4_1 and T4_2. In other words, N1 is a node at which the transistors T4_1 and T4_2 are connected. By connecting VDD to the node N1, noise from data voltage input line VDAT is shielded from the gate of the drive transistor by VDD. The SCAN signal levels initially have a high voltage value so transistors T3 and T5 are off, and the SCAND signal level also initially has a high voltage value so transistors T4_1 and T4_2 are off.

Next, at the beginning of the threshold compensation phase, the EMI signal level is changed from a low voltage value to a high voltage value, causing transistors T2 and T6 to be turned off. With transistor T2 turning off, the node, at which the source of the drive transistor T1 and capacitors $C_0$ and $C_1$ are connected, is disconnected from the power supply VDD. As the top plate of the capacitor C1 is connected to EMI, the voltage at the top plate of the capacitor C1 will change from the low voltage to the high voltage comparably as the EMI signal. The voltage at the bottom plate of the capacitor $C_1$ and the drain of the drive transistor will change to a higher voltage from VDD by $\Delta V_{EMI}$. The amount of the voltage change, $\Delta V_{EMI}$, will depend on voltage difference between the EMI signal voltage level when the transistor T2 turns off and the high voltage of the EMI signal. In conventional configurations, the EMI signal input line is only connected to an emission switch transistor (such as T2 in the described circuit configuration) but not to a capacitor associated with applying the source voltage to the drive transistor. With transistor T6 turning off, the node N1 between the off transistors T4_1 and T4_2 is disconnected from VDD.

Next during the threshold compensation phase, the SCAN signal level is changed from a high voltage value to a low voltage value, causing transistors T3 and T5 to be turned on. With transistor T3 turning on, the drain of the drive transistor and anode of the OLED are connected to an initialization voltage input line, INIT. The voltage of INIT is set to be a low voltage, which will be lower than the power supply ELVSS plus the threshold voltage of the OLED, to avoid any light emission. In this manner, the initialization voltage turns off the light-emitting diode during the threshold compensation phase. The application of the INIT voltage to the anode of the OLED in the various embodiments operates to clear memory effects from the previous frame. With transistor T5 turning on, the gate of the drive transistor T1 is connected to a reference voltage input line that supplies a reference voltage, VREF.

Preferably, to have effective threshold voltage compensation of the drive transistor T1, the voltage at the gate of the drive transistor, VREF, should satisfy the following condition:

$$V_{DD}\Delta V_{Em1}-V_{REF}>\Delta V+|V_{TH}|,$$

where $V_{TH}$ is the threshold voltage of the drive transistor T1, and ΔV is a voltage that is large enough to generate a high initial current to charge the storage capacitor within the allocated threshold compensation time. The value of ΔV will depend on the properties of the transistors. For example, ΔV would be at least 3 volts for exemplary low-temperature polycrystalline silicon thin film transistor processes. The reference voltage, VREF, is set to satisfy the voltage requirement:

$$V_{REF}<V_{DD}\Delta V_{EmI}-\Delta V-|V_{TH}|$$

With VREF set in this manner, the voltage boost from $\Delta V_{EMI}$ will make the initial voltage difference between the gate and the source of the drive transistor larger. A larger initial voltage difference will reduce the time to charge the storage capacitor $C_0$, which aids in shortening the compensation time or provides for more accurate threshold compensation.

With VREF meeting the above requirements, the drive transistor is turned on. As the source of the drive transistor is floating, the voltage level of the source of the drive transistor is pulled down until the drive transistor is turned off, whereby the voltage at the source of the drive transistor becomes:

$$V_{REF}+|V_{TH}|$$

The threshold voltage of the drive transistor thus is stored at the bottom plate of capacitor $C_1$ and the top plate of the capacitor $C_0$. In this manner, the reference voltage turns on the drive transistor at the beginning of the compensation phase and the threshold voltage of the drive transistor is stored in the first capacitor and the second capacitor when the drive transistor transitions to the off state when the source voltage at the drive transistor is pulled down.

At the end of the threshold compensation phase, the SCAN signal level is changed from a low voltage value to a high voltage value, causing transistors T3 and T5 to be turned off. With transistor T3 turning off, the drain of the drive transistor and anode of the OLED are disconnected from the power supply, INIT. With transistor T5 turning off, the gate of the drive transistor is disconnected from the reference voltage, VREF.

The TFT circuit 10 next is operable in a data programming phase. The SCAND signal level is changed from the high voltage value to the low voltage value, causing transistors T4_1 and T4_2 to be turned on, which connects a data voltage input line that supplies a data voltage, VDAT. The data voltage thus is applied at the bottom plate of the capacitor, $C_0$. The data voltage, VDAT, is changed from the value for another pixel (e.g. the previous row of the display DATA(n−1)) to the data value for the current pixel (e.g. the current row of the display DATA(n)). Considering that the parasitic capacitance is negligible, the data voltage VDAT is applied at the bottom plate of the capacitor, $C_0$. The charge change at the said bottom plate is $(V_{DAT}-V_{REF})C_0$. The same amount charge change will appear on the top plate of the capacitor, $C_0$. As both the capacitors, $C_0$ and $C_1$, are connected at the same node, the voltage change due the applied data voltage is $$\frac{C_0}{C_0+C_1}(V_{DAT}-V_{REF}).$$

In this manner, during the programming phase the second or programming capacitor C1 distributes the data voltage between the storage (first) capacitor $C_0$ and the programming (second) capacitor $C_1$.

Next the SCAND signal level is changed from the low voltage value to the high voltage value, causing transistors T4_1 and T4_2 to be turned off. The capacitor, $C_0$, is thus disconnected from the data voltage input line. The voltage at the source of the drive transistor becomes:

$$V_{REF} + |V_{TH}| + \frac{C_0}{C_0 + C_1}(V_{DAT} - V_{REF})$$

The TFT circuit 10 next is operable in an emission phase during which the OLED is capable of emitting light with a driving voltage input being supplied from VDD through T2. The EMI signal is changed from the high voltage value to the low voltage value, causing transistors T2 and T6 to be turned on.

With transistor T2 turning on, the source of the drive transistor is connected to VDD, with the voltage at the top plate of the capacitor $C_0$ changed by:

$$V_{DD} - \left(V_{REF} + |V_{TH}| + \frac{C_0}{C_0 + C_1}(V_{DAT} - V_{REF})\right)$$

As the bottom plate of the capacitor $C_0$ is floating, the voltage at the bottom plate changes by the same amount from the starting voltage $V_{DAT}$. The voltage at the bottom plate of capacitor $C_0$, and thus at the gate of the drive transistor, becomes:

$$V_{DAT} + \left(V_{DD} - \left(V_{REF} + |V_{TH}| + \frac{C_0}{C_0 + C_1}(V_{DAT} - V_{REF})\right)\right) = V_{DD} - |V_{TH}| + \frac{C_1}{C_0 + C_1}(V_{DAT} - V_{REF})$$

The current that flows through the OLED is $$I_{OLED} = \frac{\beta}{2}\left(V_{DD} - |V_{TH}| + \frac{C_1}{C_0 + C_1}(V_{DAT} - V_{REF}) - V_{DD} - V_{TH}\right)^2 = \frac{\beta}{2}\left(\frac{C_1(V_{DAT} - V_{REF})}{C_0 + C_1}\right)^2$$

where $$\beta = \mu_n \cdot C_{ox} \cdot \frac{W}{L},$$

$C_{ox}$ is the capacitance of the drive transistor gate oxide;
W is the width of the drive transistor channel;
L is the length of the drive transistor channel (i.e. distance between source and drain); and
$\mu_n$ is the carrier mobility of the drive transistor.

Accordingly, the current to the OLED does not depend on the threshold voltage of the drive transistor T1, and hence the current to the OLED device $I_{OLED}$ is not affected by the threshold voltage variations of the drive transistor. In this manner, variation in the threshold voltage of the drive transistor has been compensated.

With transistor T6 turning on by changing the EMI signal from high to low, during the emission phase VDD is applied to the node N1, which again is between the VDAT data switch transistors T4_1 and T4_2, or in other words N1 is a node at which the transistors T4_1 and T4_2 are connected. In this manner, any noise from the data voltage input line is shielded by the power supply VDD. In addition, any leakage of current through the transistor T4_2 will cause the voltage at the gate of the drive transistor to slowly drift towards VDD. As the drive transistor is a p-type transistor in this embodiment, a higher gate voltage would cause a smaller current to the OLED. The drift of voltage toward VDD will improve the blackness of the display. In addition, as referenced above, during the compensation and programming phases, the EMI signal is applied to the programming capacitor $C_1$. The voltage boost from $\Delta V_{EMI}$ through $C_1$ will make the initial voltage difference between the gate and the source of the drive transistor larger. A larger initial voltage difference will provide a higher initial current to charge the storage capacitor $C_0$, which aids in shortening the threshold compensation time or provides for more accurate threshold compensation. As another advantage, the noise from voltage data input line is isolated from the gate of the drive transistor by the application of the driving voltage to node N1 during the emission phase.

Figure 3:
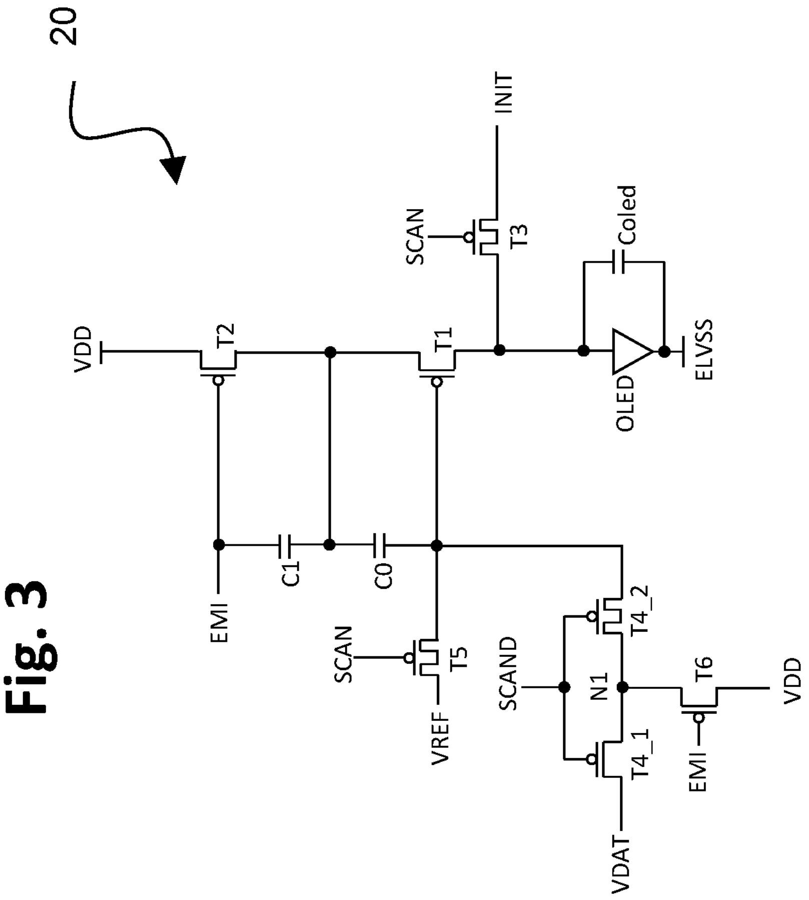
FIG. 3 is a drawing depicting a second circuit configuration in accordance with embodiments of the present invention.

FIG. 3 is a drawing depicting a second circuit configuration 20, in accordance with embodiments of the present invention. The timing and the operation method of the circuit configuration 20 is essentially the same as for the first circuit configuration 10. The difference between the first circuit configuration 10 and the second circuit configuration 20 is that transistor T4_2 is a dual gate transistor in the second circuit configuration. Comparing to the first circuit configuration, the benefit of the dual gate transistor T4_2 in the second circuit configuration is that leakage current from the gate of the drive transistor is reduced, and thus the voltage drift from the gate of the drive transistor is reduced.

One of the factors that affects the amount of the leakage current is off resistance of the data switch transistor. As a result of process variations, device mismatch could affect the off resistance, and the amount of the leakage current could cause some emission variations across the display panel. A reduced leakage current results in less variation across the display. With a dual gate transistor, the size of the data switch transistor T4_2 could be larger as compared to single gate transistor.

Figure 4:
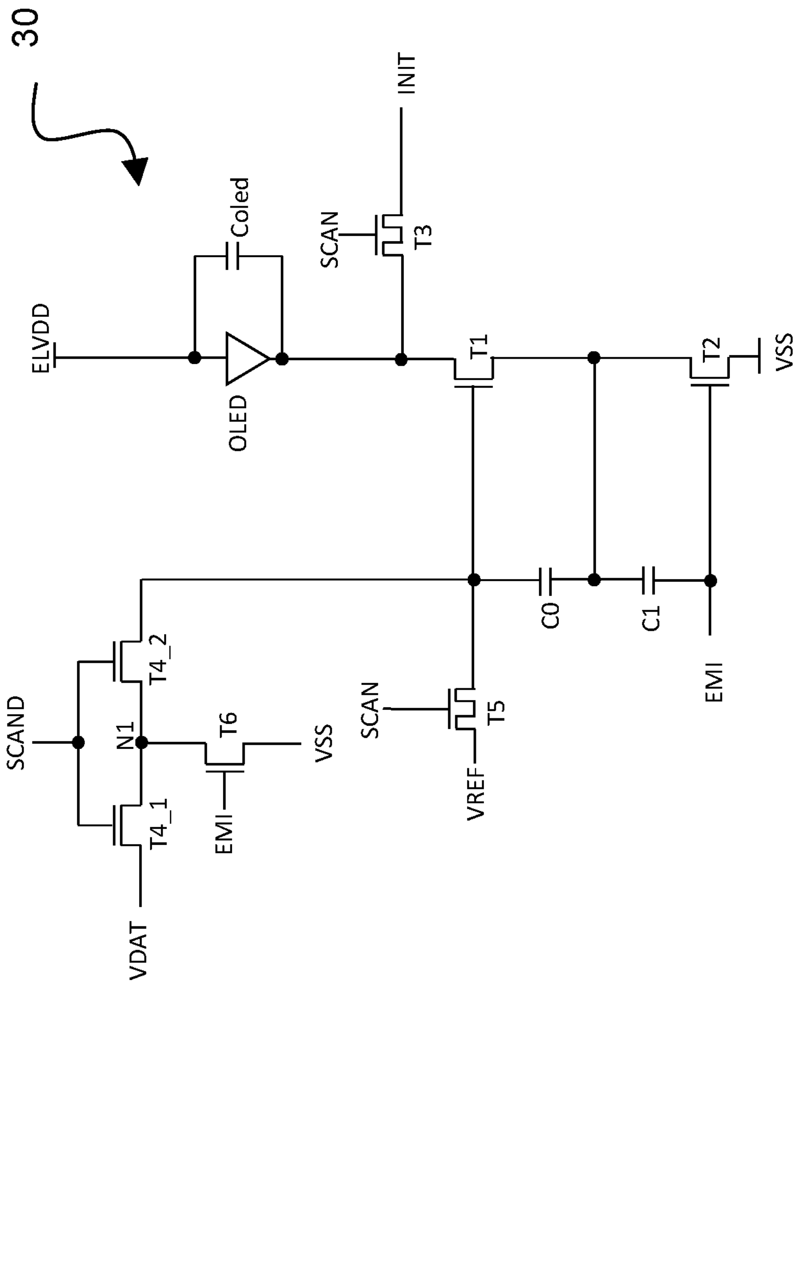
FIG. 4 is a drawing depicting a third circuit configuration in accordance with embodiments of the present invention.
Figure 5:
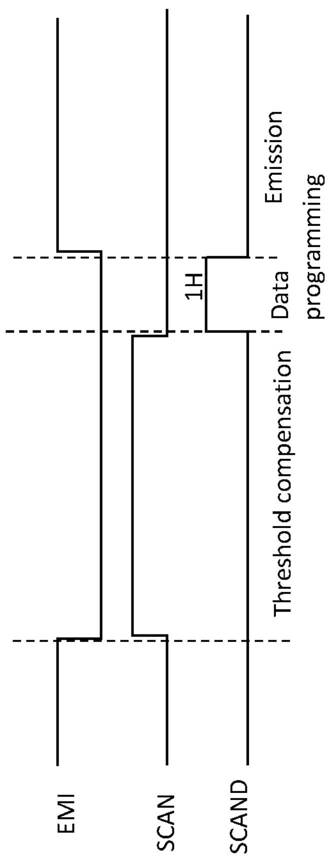
FIG. 5 is a drawing depicting a timing diagram associated with the operation of the circuit of FIG. 4.

FIG. 4 is a drawing depicting a third circuit configuration 30 in accordance with embodiments of the present invention, and FIG. 5 is a timing diagram associated with the operation of the circuit configuration 30 of FIG. 4. The circuit configuration 30 of FIG. 4 operates comparably as the circuit configuration 10 of FIG. 1, except that the circuit configuration 30 employs n-type transistors rather than p-type transistors. As is known in the art, the drive properties of an OLED may be more suitable for one or other of p-type versus n-type transistors, and the principles of the present invention are applicable to either type of configuration. Accordingly, in this example of FIG. 4, the circuit 30 is configured as a TFT circuit that includes multiple n-MOS or n-type TFTs, and two capacitors, $C_0$ and $C_1$. The circuit elements drive a light-emitting device, such as for example an OLED. The light-emitting device (OLED) again has an associated internal capacitance, which again is represented in the circuit diagram as $C_{oled}$. The OLED further is connected to the power supply ELVDD as is conventional. In addition, although the embodiments are described principally in connection with an OLED as the light-emitting device, comparable principles may be used with display technologies that employ other types of light-emitting devices, including for example micro LEDs and quantum dot LEDs.

Similarly as in the previous embodiments, T1 is a drive transistor that is an analogue TFT, and T2-T6 are digital switch TFTs. $C_0$ and C1 are capacitors, and $C_{oled}$ is the internal capacitance of the OLED device (i.e., $C_{oled}$ is not a separate component, but is inherent to the OLED). T4_2 may be an IGZO (Indium gallium zinc oxide) transistor. By using such a device, the stored data voltage is retained longer due to ultra-low leakage of the IGZO transistor. The typical refresh rate is 60 Hz, but with the IGZO transistor the refresh rate can be reduced to 30 Hz or lower for static images. With a lower refresh rate, power consumption can be reduced. T3 and T5 may be double-gate TFTs as a preferred embodiment, which again have low leakage between the source and drain, although T3 and T5 each alternatively may be a single gate TFT.

Referring to the TFT circuit 30 in combination with the timing diagram of FIG. 5, during the previous emission phase, the EMI signal level has a high voltage value, so transistor T2 and T6 are on. With T2 on, the light emission is being driven by the input driving voltage VSS connected to the drive transistor T1, whereby the actual current applied to the OLED is determined by the voltage at the gate of the drive transistor. With T6 is on, VSS is applied at the node N1, between the off transistors T4_1 and T4_2. Similarly as to the previous embodiment, the noise from data voltage input line is isolated from the gate of the drive transistor by the application of the driving voltage VSS to node N1. The SCAN signal levels initially have a low voltage value so transistors T3 and T5 are off. The SCAND signal levels initially have a low voltage value so transistors T4_1 and T4_2 are off.

Next, at the beginning of the threshold compensation phase, the EMI signal level is changed from a high voltage value to a low voltage value, causing transistors T2 and T6 to be turned off. With transistor T2 turning off, the node, where the source of the drive transistor and capacitors $C_0$ and $C_1$ are connected, is disconnected from the power supply VSS. As the bottom plate of the capacitor $C_1$ is connected to EMI, the voltage at the bottom plate of the capacitor $C_1$ will change from the high voltage to the low voltage the same as the EMI signal. The voltage at the top plate will change to a lower voltage from VSS by $\Delta V_{EMI}$. The amount of the voltage change, $\Delta V_{EMI}$, will depend on voltage difference between the EMI signal voltage level when the transistor T2 turns off and the low voltage of the EMI signal. With transistor T6 turning off, the node N1 between the off transistors T4_1 and T4_2 are disconnected from VSS.

Next during the threshold compensation phase, the SCAN signal level is changed from a low voltage value to a high voltage value, causing transistors T3 and T5 to be turned on. With transistor T3 turning on, the drain of the drive transistor and anode of the OLED are connected to an initialization voltage input line INIT. The voltage of INIT is set to be a high voltage, which will higher than the power supply ELVDD minus the threshold voltage of the OLED, to avoid any light emission. As referenced above, the application of the INIT voltage to the anode of the OLED in the various embodiments operates to clear memory effects from the previous frame. With transistor T5 turning on, the gate of the drive transistor is connected to a reference voltage input line that supplies the reference voltage, VREF.

Preferably, to have effective threshold voltage compensation of the drive transistor T1, the voltage at the gate of the drive transistor, VREF, should satisfy the following condition:

$$V_{REF}-V_{SS}-\Delta V_{EMI}>\Delta V+V_{TH},$$

where $V_{TH}$ is the threshold voltage of the drive transistor T1, and ΔV is a voltage that is large enough to generate a high initial current to charge the storage capacitor within allocated threshold compensation time. The value of ΔV will depend on the properties of the transistors. For example, ΔV would be at least 3 volts for exemplary low-temperature polycrystalline silicon thin film transistor processes. The reference voltage, VREF, is set to satisfy the voltage requirement.

$$V_{REF}>V_{SS}+\Delta V_{EMI}+\Delta V+V_{TH}$$

Similarly as to the previous embodiment, with VREF set in this manner, the voltage boost from $\Delta V_{EMI}$ will make the initial voltage difference between the gate and the source of the drive transistor larger. A larger initial voltage difference will provide a higher initial current to charge the storage capacitor $C_0$, which aids in shortening the compensation time and provides for more accurate threshold compensation.

With VREF meeting the above requirements, the drive transistor is turned on. As the source of the drive transistor is floating, the voltage level of the source of the drive transistor is pulled up until the drive transistor is turned off, and the voltage at the source of the drive transistor becomes:

$$V_{REF}-V_{TH}$$

The threshold voltage of the drive transistor is thus stored at the top plate of capacitor $C_1$ and the bottom plate of the capacitor $C_0$. In this manner, the reference voltage turns on the drive transistor at the beginning of the compensation phase and the threshold voltage of the drive transistor is stored in the first capacitor and the second capacitor when the drive transistor transitions to the off state when the source voltage at the drive transistor is pulled up.

At the end of the threshold compensation phase, the SCAN signal level is changed from a high voltage value to a low voltage value, causing transistors T3 and T5 to be turned off. With transistor T3 turning off, the drain of the drive transistor and anode of the OLED are disconnected from the initialization voltage, INIT. With transistor T5 turning off, the gate of the drive transistor is disconnected from the reference voltage, VREF.

The TFT circuit 30 next is operable in a data programming phase. The SCAND signal level is changed from a low voltage value to a high voltage value, causing transistors T4_1 and T4_2 to be turned on which provides connection to the data voltage input line that supplies the data voltage, VDAT. The data voltage thus is applied at the top plate of the storage capacitor, $C_0$. The data voltage, VDAT, is changed from the value for another pixel (e.g. the previous row of the display DATA(n−1)) to the data value for the current pixel (e.g. the current row of the display DATA(n)). Considering that the parasitic capacitance is negligible, the data voltage VDAT is applied at the top plate of the capacitor, $C_0$. The charge change at the said top plate is $(V_{DAT}-V_{REF})C_0$. The same amount charge change will appear on the bottom plate of the capacitor, $C_0$. As both the capacitors, $C_0$ and $C_1$, are connected at the same node, the voltage change due the applied data voltage is $$\frac{C_0}{C_0+C_1}(V_{DAT}-V_{REF}),$$

and thus a scaling of the data voltage by $C_1$ connected to $C_0$ occurs.

Next, the SCAND signal level is changed from the high voltage value to the low voltage value, causing transistors T4_1 and T4_2 to be turned off. The capacitor, $C_0$, is disconnected from the data line, and the voltage at the source of the drive transistor becomes $$V_{REF} - V_{TH} + \frac{C_0}{C_0 + C_1}(V_{DAT} - V_{REF})$$

The TFT circuit 30 next is operable in an emission phase during which the OLED is capable of emitting light with a driving voltage input being supplied from VSS through T2. The EMI signal is changed from the low voltage value to the high voltage value, causing transistors T2 and T6 to be turned on.

With transistor T2 turning on, the source of the drive transistor is connected to VSS, and the voltage at the bottom plate of the capacitor $C_0$ changed by:

$$V_{SS} - \left(V_{REF} - V_{TH} + \frac{C_0}{C_0 + C_1}(V_{DAT} - V_{REF})\right)$$

As the top plate of the capacitor $C_0$ is floating, the voltage at the top plate changes by the same amount from starting voltage VDAT. The voltage at the top plate of capacitor $C_0$, and thus the gate of the drive transistor becomes:

$$V_{DAT} + \left(V_{SS} - \left(V_{REF} - V_{TH} + \frac{C_0}{C_0 + C_1}(V_{DAT} - V_{REF})\right)\right) = V_{SS} + V_{TH} + \frac{C_1}{C_0 + C_1}(V_{DAT} - V_{REF})$$

The current that flows through the OLED is:

$$I_{OLED} = \frac{\beta}{2}\left(V_{SS} + V_{TH} + \frac{C_1}{C_0 + C_1}(V_{DAT} - V_{REF}) - V_{SS} - V_{TH}\right)^2 = \frac{\beta}{2}\left(\frac{C_1(V_{DAT} - V_{REF})}{C_0 + C_1}\right)^2$$

where $$\beta = \mu_n \cdot C_{ox} \cdot \frac{W}{L},$$

$C_{ox}$ is the capacitance of the drive transistor gate oxide;
W is the width of the drive transistor channel;
L is the length of the drive transistor channel (i.e. distance between source and drain); and
$\mu_n$ is the carrier mobility of the drive transistor.

Accordingly, the current to the OLED does not depend on the threshold voltage of the drive transistor T1, and hence the current to the OLED device $I_{OLED}$ is not affected by the threshold voltage variations of the drive transistor. In this manner, variation in the threshold voltage of the drive transistor has been compensated.

Similar to the previous embodiment, with transistor T6 turning on during the emission phase, the driving voltage VSS is applied to the node N1 between the data switch transistors T4_1 and T4_2, or in other words N1 is a node at which the transistors T4_1 and T4_2 are connected. Any noise from the data voltage input line is thus shielded by the power supply VSS. The leakage current through the transistor T4_2 will cause the voltage at the gate of the drive transistor to slowly drift towards VSS. As the drive transistor is an n-type transistor, a lower gate voltage will cause a smaller current to the OLED, and in this manner the drift of the gate voltage of the drive transistor toward VSS will improve the blackness of the display. In addition, it is again preferred that an ultra-low leakage oxide transistor, such as an indium gallium zinc oxide (IGZO) device, is used as the data switch transistor T4_2. By using such a device, the stored data voltage is retained longer due to ultra-low leakage of the IGZO device, which reduces the refresh rate.

The circuit configuration 30 and operation as described above also has comparable advantages over conventional configurations. By using an IGZO device as the data switch transistor to achieve the reduced refresh rate, power consumption is reduced. In addition, as referenced above, during the compensation and programming phases, the EMI signal is applied to the programming capacitor $C_1$. The voltage boost from $\Delta V_{EMI}$ through $C_1$ will make the initial voltage difference between the gate and the source of the drive transistor larger. A larger initial voltage difference will reduce the time to charge the storage capacitor $C_0$, which aids in shortening the programming time and provides for more accurate threshold compensation. As another advantage, the noise from the data voltage input line is isolated from the gate of the drive transistor by the application of the driving voltage to node N1 during the emission phase.

Figure 6:
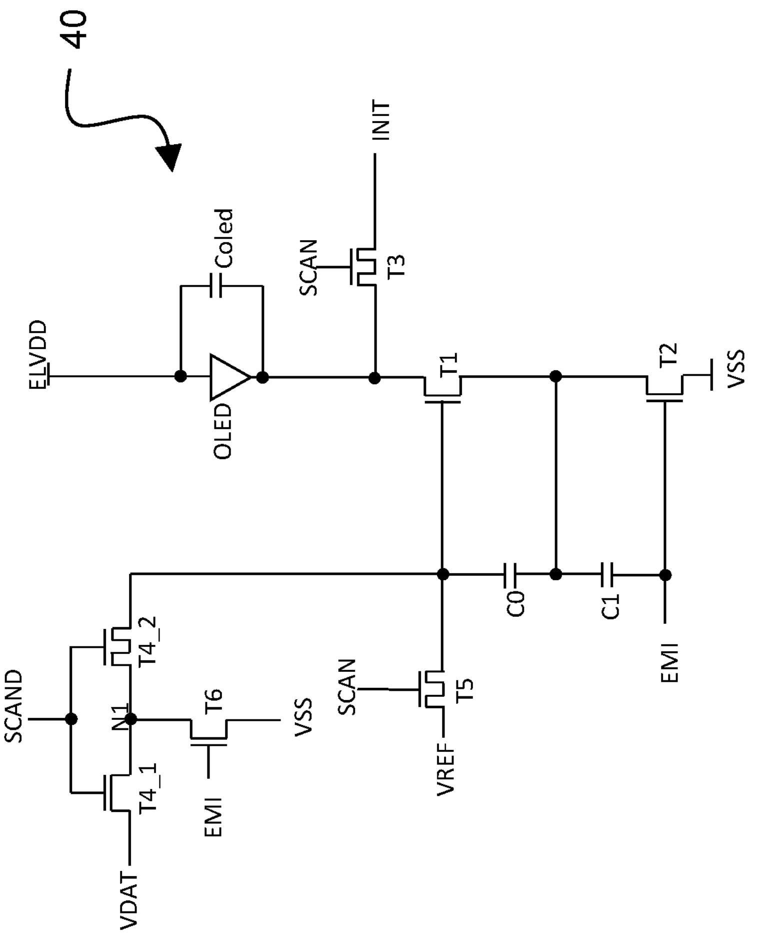
FIG. 6 is a drawing depicting a fourth circuit configuration in accordance with embodiments of the present invention.

FIG. 6 is a drawing depicting a fourth circuit configuration 40, in accordance with embodiments of the present invention. The timing and the operation method of the circuit configuration 40 is essentially the same as the third circuit configuration 30. The difference between the third circuit configuration 30 and the fourth circuit configuration 40 is that transistor T4_2 is a dual gate transistor in the fourth circuit configuration. Comparing to the third circuit configuration, the benefit of the dual gate transistor in the fourth circuit configuration is the leakage current from the gate of the drive transistor is reduced, and thus the voltage drift from the gate of the drive transistor is reduced.

As described above, one of the factors that affects the amount of the leakage current is off resistance of the data switch transistor. As a result of process variations, device mismatch could affect the off resistance, and the amount of the leakage current could cause some emission variations across the display panel. A reduced leakage current results in less variation across the display. With a dual gate transistor, the size of the data switch transistor T4_2 could be larger as compared to single gate transistor.

An aspect of the invention, therefore, is a pixel circuit for a display device operable in a compensation phase, a data programming phase, and an emission phase, whereby the one horizontal time is minimized while maintaining accurate compensation of the threshold voltage of the drive transistor, and noise applied to the gate of drive transistor during the emission phase is substantially eliminated. In exemplary embodiments, the pixel circuit includes a drive transistor configured to control an amount of current from a first power supply to a light-emitting device during the emission phase depending upon a voltage input applied to a gate of the drive transistor, and a threshold voltage of the drive transistor is compensated during the compensation phase; wherein the light-emitting device is electrically connected at a first node to a first terminal of the drive transistor during the emission phase and at a second node to a second power supply; a second transistor that is connected between the first power supply and a second terminal of the drive transistor that conducts current from the first power supply to the drive transistor during the emission phase; a first capacitor having a first plate that is connected to the second terminal of the drive transistor and a second plate that is connected to the gate of the drive transistor, and a second capacitor having a first plate that connected to an emission signal input line and a second plate that is connected to the second terminal of the drive transistor and first plate of the first capacitor, wherein the emission signal is applied to the second capacitor during the compensation and data programming phases; and a third transistor and a fourth transistor, wherein the third transistor is connected between a data voltage input line and the fourth transistor, and the fourth transistor is connected between the third transistor and the gate of the drive transistor, such that when the third and the fourth transistors are in an on state during the data programming phase, the data voltage is applied to the gate of the drive transistor. The pixel circuit may include one or more of the following features, either individually or in combination.

In an exemplary embodiment of the pixel circuit, the pixel circuit further includes a fifth transistor that is connected between the first power supply and a node N1 between the third and fourth transistors, such that during the emission phase, the first power supply is applied to the node N1 to shield the drive transistor from noise from the data voltage input line.

In an exemplary embodiment of the pixel circuit, the fourth transistor is a dual gate transistor.

In an exemplary embodiment of the pixel circuit, the pixel circuit further includes a sixth transistor that is connected between a reference voltage input line and the gate of the drive transistor, wherein the reference voltage turns on the drive transistor at the beginning of the compensation phase and the threshold voltage of the drive transistor is stored in the first capacitor and the second capacitor when the drive transistor is in an off state.

In an exemplary embodiment of the pixel circuit, the sixth transistor is a dual gate transistor.

In an exemplary embodiment of the pixel circuit, the pixel circuit further includes a seventh transistor that is connected between the first node of the light-emitting device and an initialization voltage input line, wherein the initialization voltage turns off the light-emitting device during the compensation phase.

In an exemplary embodiment of the pixel circuit, the seventh transistor is a dual gate transistor.

In an exemplary embodiment of the pixel circuit, the light-emitting device is one of an organic light-emitting diode, a micro light-emitting diode (LED), or a quantum dot LED.

In an exemplary embodiment of the pixel circuit, the transistors are p-type transistors.

In an exemplary embodiment of the pixel circuit, the transistors are n-type transistors.

In an exemplary embodiment of the pixel circuit, the fourth transistor is an indium gallium zinc oxide transistor.

Another aspect of the invention is a method of operating a pixel circuit according to any of the embodiments, whereby the one horizontal time is minimized while maintaining accurate compensation of the threshold voltage of the drive transistor, and noise applied to the gate of drive transistor during the emission phase is substantially eliminated. In exemplary embodiments, the method of operating includes the steps of providing a pixel circuit according to any of the embodiments; performing a compensation phase to compensate a threshold voltage of the drive transistor comprising: electrically disconnecting the second terminal of the drive transistor from the first power supply; boosting the voltage of the second terminal of the drive transistor by applying an emission signal from the emission signal input line to the first plate of the second capacitor; applying a reference voltage from a reference voltage input line to the gate of the drive transistor; and storing the threshold voltage of the drive transistor at the terminals of the first and the second capacitors and the second terminal of the drive transistor; performing a data programming phase to program a data voltage to the capacitors comprising applying the data voltage from the data voltage input line at the first plate of the first capacitor through the third and fourth transistors while the third and fourth transistors are in an on state; and performing an emission phase during which light is emitted from the light-emitting device comprising applying the first power supply through the drive transistor to the light emitting device while the second transistor is in an on state. The method of operating may include one or more of the following features, either individually or in combination.

In an exemplary embodiment of the method operating, performing the emission phase further comprises applying the first power supply to the node N1 to shield the drive transistor from noise from the data voltage input line while the fifth transistor is in an on state.

In an exemplary embodiment of the method operating, performing the compensation phase further comprises applying the reference voltage through the sixth transistor to turn on the drive transistor at the beginning of the compensation phase while the sixth transistor is in an on state, and the threshold voltage of the drive transistor is stored in the first capacitor and the second capacitor when the drive transistor is in an off state.

In an exemplary embodiment of the method operating, performing the compensation phase further comprises applying the initialization voltage to turn off the light-emitting device.

In an exemplary embodiment of the method operating, control of the application of the initialization voltage is performed using a control signal that is the same as a control signal that controls application of the reference voltage.

In an exemplary embodiment of the method operating, control of the application of the data voltage is performed using a control signal that is different from a control signal that controls application of the reference voltage.

In an exemplary embodiment of the method operating, the fourth transistor is an indium gallium zinc oxide transistor.

In an exemplary embodiment of the method operating, the fourth transistor is a dual gate transistor.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices to permit display devices of high resolution with effective threshold voltage compensation and true black performance. Examples of such devices include televisions, mobile phones, personal digital assistants (PDAs), tablet and laptop computers, desktop monitors, digital cameras, and like devices for which a high resolution display is desirable.

REFERENCE SIGNS LIST

10—first circuit configuration
20—second circuit configuration
30—third circuit configuration
40—fourth circuit configuration
T1-T3, T4_1, T4_2, T5, T6—multiple transistors
OLED—organic light emitting diode (or generally light-emitting device)
$C_0$, $C_1$—capacitor
$C_{oled}$—internal capacitance of OLED
N1—Node between data switch transistors
VDAT—data voltage input line
VDD—power supply
VSS—power supply
ELVSS—power supply
ELVDD—power supply
VREF—reference voltage input line
INIT—initialization voltage input line
SCAN/EMI/SCAND—control signals

What is claimed is:

1. A pixel circuit for a display device operable in a compensation phase, a data programming phase, and an emission phase, the pixel circuit comprising:

a drive transistor configured to control an amount of current from a first power supply to a light-emitting device during the emission phase depending upon a voltage input applied to a gate of the drive transistor, and a threshold voltage of the drive transistor is compensated during the compensation phase;

wherein the light-emitting device is electrically connected at a first node to a first terminal of the drive transistor during the emission phase and at a second node to a second power supply;

a second transistor that is connected between the first power supply and a second terminal of the drive transistor that conducts current from the first power supply to the drive transistor during the emission phase;

a first capacitor having a first plate that is connected to the second terminal of the drive transistor and a second plate that is connected to the gate of the drive transistor;

a second capacitor having a first plate that is connected to an emission signal input line and a second plate that is connected to the second terminal of the drive transistor and the first plate of the first capacitor, a third transistor and a fourth transistor, wherein the third transistor is connected between a data voltage input line and the fourth transistor, and the fourth transistor is connected between the third transistor and a gate of the drive transistor, such that when the third and the fourth transistors are in an on state during the data programming phase, the data voltage is applied to the gate of the drive transistor; and a fifth transistor that is connected between the first power supply and a node N1 between the third and fourth transistors, such that during the emission phase, the first power supply is applied to the node N1 to shield the drive transistor from noise from the data voltage input line.

2. The pixel circuit of claim 1, wherein the fourth transistor is a dual gate transistor.

3. The pixel circuit of claim 1, further comprising a sixth transistor that is connected between a reference voltage input line and the gate of the drive transistor, wherein the reference voltage turns on the drive transistor at the beginning of the compensation phase and the threshold voltage of the drive transistor is stored in the first capacitor and the second capacitor when the drive transistor is in an off state.

4. The pixel circuit of claim 3, wherein the sixth transistor is a dual gate transistor.

5. The pixel circuit of claim 1, further comprising a seventh transistor that is connected between the first node of the light-emitting device and an initialization voltage input line, wherein the initialization voltage turns off the light-emitting device during the compensation phase.

6. The pixel circuit of claim 5, wherein the seventh transistor is a dual gate transistor.

7. The pixel circuit of any of claim 1, wherein the light-emitting device is one of an organic light-emitting diode, a micro light-emitting diode (LED), or a quantum dot LED.

8. The pixel circuit of claim 1, wherein the transistors are p-type transistors.

9. The pixel circuit of claim 1, wherein the transistors are n-type transistors.

10. The pixel circuit of claim 1, wherein the fourth transistor is an indium gallium zinc oxide transistor.

11. A method of operating a pixel circuit for a display device comprising the steps of:

providing a pixel circuit comprising:

a drive transistor configured to control an amount of current from a first power supply to a light-emitting device during an emission phase depending upon a voltage input applied to a gate of the drive transistor;

wherein the light-emitting device is electrically connected at a first node to a first terminal of the drive transistor during the emission phase and at a second node to a second power supply;

a second transistor that is connected between the first power supply and a second terminal of the drive transistor that conducts current from the first power supply to the drive transistor during the emission phase;

a first capacitor having a first plate that is connected to the second terminal of the drive transistor and a second plate that is connected to the gate of the drive transistor;

a second capacitor having a first plate that is connected to an emission signal input line and a second plate that is connected to the second terminal of the drive transistor and the first plate of the first capacitor; and a third transistor and a fourth transistor, wherein the third transistor is connected between a data voltage input line and the fourth transistor, and the fourth transistor is connected between the third transistor and a gate of the drive transistor;

performing a compensation phase to compensate a threshold voltage of the drive transistor comprising: electrically disconnecting the second terminal of the drive transistor from the first power supply; boosting the voltage of the second terminal of the drive transistor by applying an emission signal from the emission signal input line to the first plate of the second capacitor; applying a reference voltage from a reference voltage input line to the gate of the drive transistor; and storing the threshold voltage of the drive transistor at the terminals of the first and the second capacitors and the second terminal of the drive transistor;

performing a data programming phase to program a data voltage to the capacitors comprising applying the data voltage from the data voltage input line at the first plate of the first capacitor through the third and fourth transistors while the third and fourth transistors are in an on state; and performing an emission phase during which light is emitted from the light-emitting device comprising applying the first power supply through the drive transistor to the light emitting device while the second transistor is in an on state;

wherein the pixel circuit further comprises a fifth transistor that is connected between the first power supply and a node N1 between the third and fourth transistors, and performing the emission phase further comprises applying the first power supply to the node N1 to shield the drive transistor from noise from the data voltage input line while the fifth transistor is in an on state.

12. The method of operating of claim 11, wherein the pixel circuit further comprises a sixth transistor that is connected between the reference voltage input line and the gate of the drive transistor, and performing the compensation phase further comprises applying the reference voltage through the sixth transistor to turn on the drive transistor at the beginning of the compensation phase while the sixth transistor is in an on state, and the threshold voltage of the drive transistor is stored in the first capacitor and the second capacitor when the drive transistor is in an off state.

13. The method of operating of claim 11, wherein the pixel circuit further comprises a seventh transistor that is connected between the first node of the light-emitting device and an initialization voltage input line, and performing the compensation phase further comprises applying the initialization voltage to turn off the light-emitting device.

14. The method of operating of claim 13, wherein control of the application of the initialization voltage is performed using a control signal that is the same as a control signal that controls application of the reference voltage.

15. The method of operating of claim 11, wherein control of the application of the data voltage is performed using a control signal that is different from a control signal that controls application of the reference voltage.

16. The method of operating of claim 11, wherein the fourth transistor is an indium gallium zinc oxide transistor.

17. The method of operating of claim 11, wherein the fourth transistor is a dual gate transistor.

18. The method of operating of claim 11, wherein the light-emitting device is one of an organic light-emitting diode, a micro light-emitting diode (LED), or a quantum dot LED.

19. A method of operating a pixel circuit for a display device comprising the steps of:

providing a pixel circuit comprising:

a drive transistor configured to control an amount of current from a first power supply to a light-emitting device during an emission phase depending upon a voltage input applied to a gate of the drive transistor;

wherein the light-emitting device is electrically connected at a first node to a first terminal of the drive transistor during the emission phase and at a second node to a second power supply;

a second transistor that is connected between the first power supply and a second terminal of the drive transistor that conducts current from the first power supply to the drive transistor during the emission phase;

a first capacitor having a first plate that is connected to the second terminal of the drive transistor and a second plate that is connected to the gate of the drive transistor;

a second capacitor having a first plate that is connected to an emission signal input line and a second plate that is connected to the second terminal of the drive transistor and the first plate of the first capacitor; and a third transistor and a fourth transistor, wherein the third transistor is connected between a data voltage input line and the fourth transistor, and the fourth transistor is connected between the third transistor and a gate of the drive transistor;

performing a compensation phase to compensate a threshold voltage of the drive transistor comprising: electrically disconnecting the second terminal of the drive transistor from the first power supply; boosting the voltage of the second terminal of the drive transistor by applying an emission signal from the emission signal input line to the first plate of the second capacitor; applying a reference voltage from a reference voltage input line to the gate of the drive transistor; and storing the threshold voltage of the drive transistor at the terminals of the first and the second capacitors and the second terminal of the drive transistor;

performing a data programming phase to program a data voltage to the capacitors comprising applying the data voltage from the data voltage input line at the first plate of the first capacitor through the third and fourth transistors while the third and fourth transistors are in an on state; and performing an emission phase during which light is emitted from the light-emitting device comprising applying the first power supply through the drive transistor to the light emitting device while the second transistor is in an on state;

wherein the pixel circuit further comprises a seventh transistor that is connected between the first node of the light-emitting device and an initialization voltage input line, and performing the compensation phase further comprises applying the initialization voltage to turn off the light-emitting device; and wherein control of the application of the initialization voltage is performed using a control signal that is the same as a control signal that controls application of the reference voltage.

* * * * *